United States Patent [19]
Holsinger

[11] Patent Number: 5,892,783
[45] Date of Patent: Apr. 6, 1999

[54] LASER WITH TEMPERATURE CONTROLLER POSITIONED IN LASER HEAD

[75] Inventor: Kevin Holsinger, Menlo Park, Calif.

[73] Assignee: Spectra Physics Lasers, Inc., Mt. View, Calif.

[21] Appl. No.: 858,723

[22] Filed: May 19, 1997

[51] Int. Cl.[6] ......................................... H01S 3/04
[52] U.S. Cl. .................. 372/34; 372/19; 372/22; 372/97; 372/69; 359/328
[58] Field of Search .................. 372/21, 22, 23, 372/34, 36, 69, 70, 92, 97, 98, 19; 359/328

[56] References Cited

U.S. PATENT DOCUMENTS

| | | | |
|---|---|---|---|
| 4,809,291 | 2/1989 | Byer et al. ................................ | 372/75 |
| 5,181,214 | 1/1993 | Berger et al. ............................ | 372/34 |
| 5,253,260 | 10/1993 | Palombo ................................. | 372/34 |
| 5,267,252 | 11/1993 | Amano .................................... | 372/34 |
| 5,331,652 | 7/1994 | Rapoport et al. ......................... | 372/34 |
| 5,638,388 | 6/1997 | Nighan, Jr. et al. ...................... | 372/22 |
| 5,696,780 | 12/1997 | Pieterse et al. ............................ | 372/19 |

FOREIGN PATENT DOCUMENTS

| | | | |
|---|---|---|---|
| 0 398 570 A2 | 11/1990 | European Pat. Off. ............. | 372/19 X |
| WO 95/21480 | 8/1995 | WIPO .................................... | 372/19 X |

*Primary Examiner*—Brian Healy
*Attorney, Agent, or Firm*—Wilson Sonsini Goodrich & Rosati

[57] ABSTRACT

A laser includes a laser head and a power supply. At least two resonator mirrors define a resonator cavity. A gain medium is positioned in the resonator cavity. A temperature controller is positioned in the laser head and is coupled to the gain medium. The temperature controller maintains the gain medium at a temperature of 25 degrees C. or greater. A pump source supplies a pump beam to the gain medium and producing an output beam. The power source is coupled to the pump source.

29 Claims, 6 Drawing Sheets

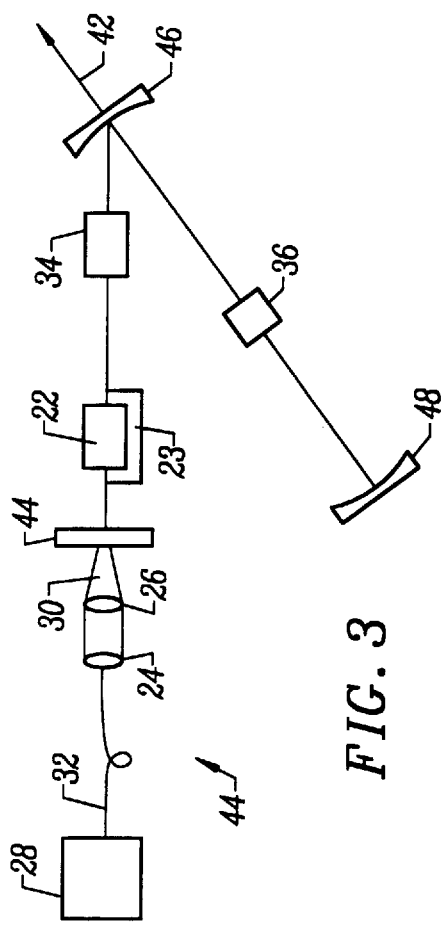
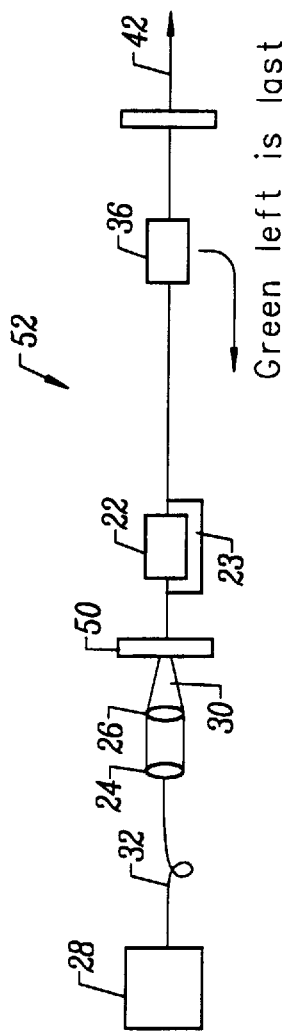
FIG. 3
FIG. 4

LASER WITH TEMPERATURE CONTROLLER POSITIONED IN LASER HEAD

BACKGROUND OF THE INVENTION

1. Field of the Invention

This invention relates generally a laser with a temperature controller that maintains the gain medium at a temperature of 25 degrees C. or greater, and more particularly to a laser with a temperature controller that is positioned in the laser head.

2. Description of Related Art

The optical pump process in a solid-state laser gain medium is associated with the generation of heat. Efficient heat removal and reduction of the thermal effects which are caused by the temperature gradients across the active area of the gain medium often dominate design considerations for high-average-power systems.

Surface cooling of the gain medium has been utilized to remove heat. The combination of volumetric heating of the gain medium by the absorbed pump radiation and surface cooling required for heat extraction leads to a nonuniform temperature distribution in the gain medium. This can result in a distortion of the output beam due to a temperature and stress-dependent variation of the index of refraction. The thermal effects occur in the gain medium are thermal lensing and thermal stress-induced birefringence.

An additional issue associated with thermal loading is stress fracture of the gain medium. Stress fracture occurs when the stress induced by temperature gradients in the gain medium exceeds the tensile strength of the material.

Temperature gradients generate mechanical stresses in the gain medium, since the hotter inside area is constrained from expansion by the cooler outer zone. Optical distortions are a result of both temperature gradients and stresses.

Cooling of the gain medium can be achieved with liquids and gases. Conductive cooling is used by mounting the gain medium directly to a heat sink.

These methods are expensive. Additionally, these methods do not provide for control of gain medium temperature.

There is a need for a laser with a temperature controller positioned in the laser head. There is a further need for a laser with a temperature controller that maintains the gain medium at a temperature of 25 degrees or higher.

SUMMARY OF THE INVENTION

It is an object of the invention to a laser with a temperature controller.

Another object of the invention is to provide a laser with a temperature controller that maintains that gain medium at a selected temperature.

Yet another object of the invention is to provide a laser with a temperature controller that maintains the gain medium at a temperature of 25 degrees C. or higher.

Still a further object of the invention is to provide a laser with a temperature controller positioned in a laser head.

A further object of the invention is to provide a laser with a variable speed fan temperature controller.

Yet another object of the invention is to provide a multi axial mode laser with a variable speed fan temperature controller that operates with at least 10 axial modes and produces a green output.

These and other objects of the invention are achieved in a multi axial mode laser with at least two resonator mirrors defining a first resonator cavity. A gain medium is positioned in the first resonator cavity. A temperature controller is coupled to the gain medium and configured to maintain the gain medium at a temperature at least equal to 25 degrees C. A pump source supplies a pump beam to the gain medium. A first output beam is produced with a plurality of axial modes with a % RMS less than 3%. A power source is coupled to the pump source.

In another embodiment, the laser has a laser head and a power supply. At least two resonator mirrors define a resonator cavity. A gain medium is positioned in the resonator cavity. A temperature controller is positioned in the laser head and is coupled to the gain medium. The temperature controller maintains the gain medium at a temperature of 25 degrees C. or greater. A pump source supplies a pump beam to the gain medium and producing an output beam. The power source is coupled to the pump source.

The temperature controller can be a variable speed fan. The resonator can have a sufficient length to produce at least 10 axial modes.

DETAILED DESCRIPTION OF THE DRAWINGS

FIG. 3 is a schematic diagram of a single port, diode pumped, multi axial mode, intracavity frequency doubled laser with high amplitude stability.

FIG. 4 is a schematic diagram of a single port, diode pumped, multi axial mode, intracavity frequency doubled laser with high amplitude stability where a portion of the generated frequency doubled light is lost.

DETAILED DESCRIPTION OF THE PREFERRED EMBODIMENTS

For the purposes of the following description of the invention, the following definitions are used:

- a "high power" frequency doubled output as a power greater than 300 mW.
- a "high optical efficiency" as an optical efficiency ($P_{out}/P_{incident,diode}$) that is greater than 5%.
- a "high electrical to optical efficiency" for a diode pumped intracavity frequency doubled laser as an efficiency ($P_{out}/P_{electrical,diode}$) greater than 1
- a "multi axial" mode intracavity frequency-doubled laser as a laser where 10 or more axial modes are oscillating.
- a "highly amplitude stable" intracavity frequency doubled laser, or the same laser with "high amplitude stability" as one where the percent root mean square (% RMS) from 10 Hz to 10 MHz is less than 3%.

The multi axial mode laser of the present invention has at least two resonator mirrors defining a first resonator cavity. A gain medium is positioned in the first resonator cavity. A temperature controller is coupled to the gain medium and configured to maintain the gain medium at a temperature at least equal to 25 degrees C. A pump source supplies a pump beam to the gain medium. A first output beam is produced with a plurality of axial modes with a % RMS of less than 3%. A power source is coupled to the gain medium. The laser is highly optically efficient, with an optical efficiency greater than 5% and preferably greater than 12%. The laser is highly electrical efficient, with an electrical efficiency greater than 1%, and preferably greater than 4%. The frequency doubled beam is of high optical quality, which means that a substantial fraction of its power is nearly diffraction limited.

Figure 1:
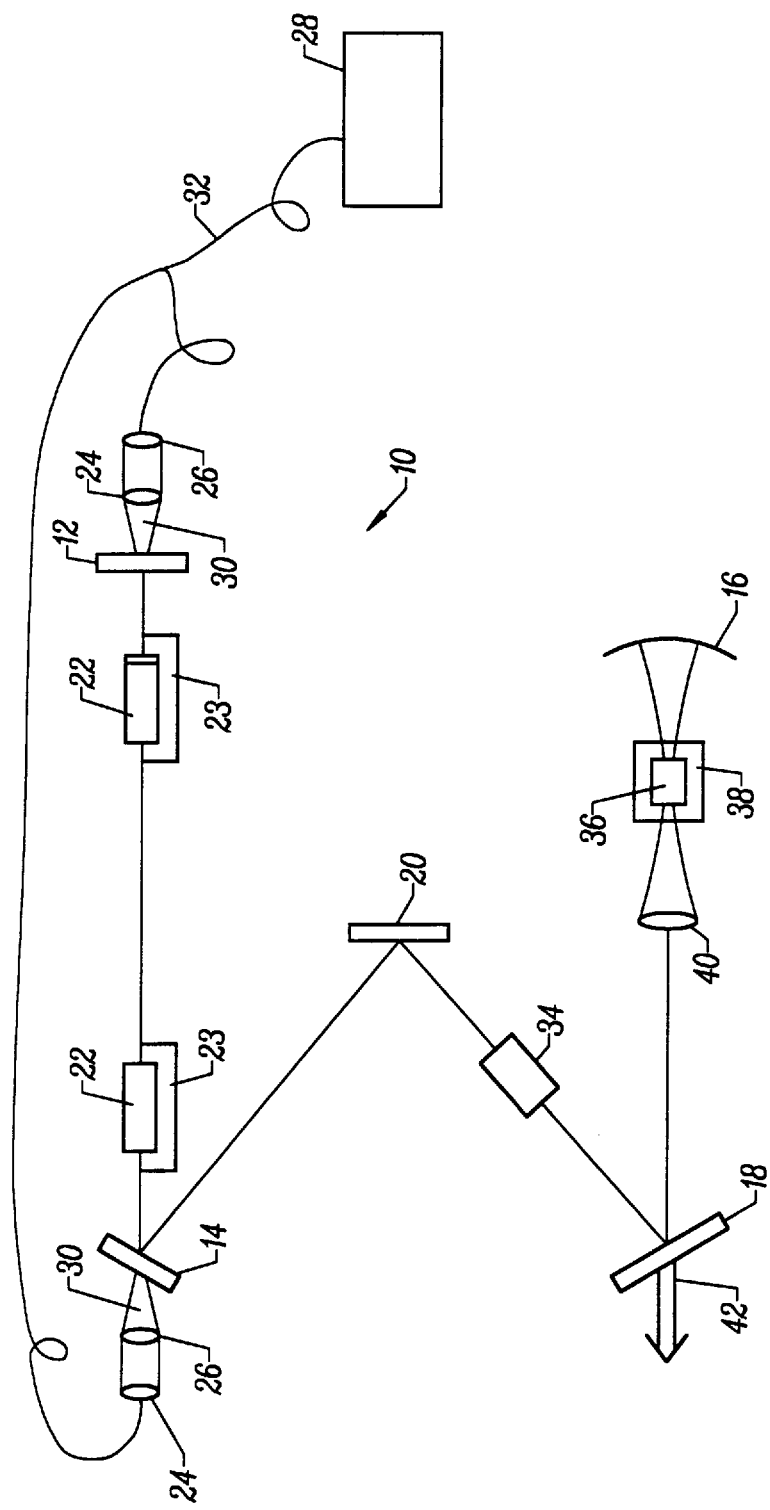
FIG. 1 is a schematic diagram of a multi axial laser resonator with a temperature controller.

One embodiment of the present invention is illustrated in FIG. 1 where the laser produces a multi-axial mode output. A bounded, standing wave resonator 10 for 1053 nm is illustrated. Resonator 10 can be multi-port and diode pumped with four arms, each arm with its own optical axis. The first arm is defined by a high reflector 12, which is highly reflecting at 1053 nm and highly transmissive at a pump wavelength of 797 nm, and a high reflector 14, which is highly reflecting at 1053 nm and highly transmissive at 797. The distance between reflectors 12 and 14 is L1. The second arm of resonator 10 is defined by a high reflector 16, highly reflecting at 1053 nm, and highly reflecting at 527 nm, and an output coupler 18, highly reflecting at 1053 nm and highly transmissive at 527 nm. It has a length of L2. The third arm, with a length of L3, is defined by high reflector 14 and a high reflector 20, which is highly reflecting at 1053 nm. High reflector 20 is, essentially, a fold mirror. The fourth arm, with a length of L4, is defined by high reflector 20 and output coupler 18. An optical Brewster plate 34 can be placed in this arm. Although the optical elements in this embodiment are specific for 1053 nm, 797 nm and 527 nm, it will be appreciated that the optical elements can have other transmission and reflectivity characteristics, depending on pump source, laser crystal and doubling crystal.

The length of resonator 10 is L, and it equals the total lengths of the four arms. One or more laser crystals 22 are positioned in the first arm along its optical axis. Suitable crystals include but are not limited to Nd:YLF, Nd:YAG, Nd:YVO4, Nd:GVO4, Nd:YPO4, Nd:BEL, Nd:YALO and Nd:LSB. A preferred crystal material is Nd:YLF. A temperature controller 23 is coupled to gain medium 22. In one embodiment, temperature controller maintains laser crystal at a temperature in the range of 25 to 75 degrees C. and in another embodiment at a temperature in the range of 45 to 50 degrees C. Temperature controller 23 can be a variable speed fan, one or more resistive heaters, a thermoelectric control device, a combination variable speed fan/resistive heater, and the like.

Positioned adjacent to reflectors 12 and 14 are a pair of lenses 24 and 26, arranged in a telescope configuration. A diode pump source 28 produces a pump beam 30 that is focussed to a desired size by lenses 24 and 26. The telescope arrangement provides for the focussing of pump beam 30 from a pump source 28. The size of the pump beam is optimized with lenses 24 and 26 to avoid fracture of incident faces of crystals 22 while increasing useful pump power. The TEM00 mode size diameter of the infrared beam in the laser crystals is about 1 millimeter.

Pump source 28 can be a single diode, spatial emitter, diode bar or a plurality of diodes or diode bars. A suitable diode source 28 is model No. OPC-A020-797-CS, available from OptoPower Corporation, Tuscon, Ariz. Preferred wavelengths of diode pump source 28 are in the range of 795 to 815 nm. Wavelengths useful for pumping specific laser crystals 22 are as follows: Tm:YAG—785 nm; Nd:YLF—797; and Nd:YAG, Nd:YVO4—809 nm.

In the embodiment of FIG. 1, two laser crystals 22 are end pumped. It is possible to include only one crystal and pump both sides, or alternatively, pump only one side of a single gain medium 22. As shown in FIG. 1, a single diode pump source 28 is used. Separate pump sources can be used for each end of the first arm of resonator 10.

Diode pump source 28 can be coupled to one or more optical fibers 32. Preferably, a bundle of optical fibers 32 are utilized. Suitable fibers include but are not limited to those that have silica cores with silica cladding. Coupling of optical fibers 32 to diode pump source 28 can be achieved as taught in U.S. Pat. No. 5,127,068.

Optionally included in resonator 10 is a Brewster plate 34, which can be used to insure operation at a particular polarization. Brewster plate 34 can be positioned along the optical axis of either the third or fourth arms. A doubling crystal 36 is positioned in the second arm. In one embodiment, doubling crystal 36 is LBO. Other suitable doubling crystals include KTP, KDP, BBO, LIO, $LiNbO_3$, and $KNbO_3$. When LBO is used, a heating element 38 is included. A suitable heating element 38 is a resistive heater or a thermoelectric device as available from Melcor, Trenton, N.J. 08648.

LBO doubling crystal 36 is used in a Type I, non-critical-phase-matched (NCPM) geometry, where the phase-matching is controlled with temperature, typically about 160° to 175° C. The high acceptance angle of non-critical-phase-matching (NCPM) in the LBO doubling crystal 36 allows resonator 10 to be adjusted in a manner that yields high beam quality and nearly TEM00 operation. Other types of phase matching do not preserve beam quality upon tight focussing, which can cause multi-spatial mode behavior.

High amplitude stability is maintained for tilting of the LBO crystal to either side of normal, for translation of the Z position of the LBO doubling crystal 36 and/or high reflector 16, and temperature tuning the LBO by +/−3° C. of the optimum temperature. These adjustments sacrifice a small amount of useful output power of resonator 10.

Pump beam 30 passes through laser crystals 22 and an infrared laser crystal beam is created. The laser crystal beam is then incident upon a face of LBO crystal 36. However, a small waist, on the order of about 50 $\mu$m diameter or less, is preferably generated inside LBO doubling crystal 36 in order to produce a very high intensity infrared beam within LBO crystal 36. High intensity is needed because the conversion of infrared to green increases nonlinearly (as the square) with the infrared intensity. The infrared laser crystal beam is focussed to the much smaller waist diameter by the inclusion of a lens 40 between output coupler 18 and LBO doubling crystal 36 and by the use of a high reflector 16 that has focussing powers. A suitable lens 40 is antireflection coated at the infrared and doubled wavelength, and is of focal length 30 to 50 mm. High reflector 16 has a radius of curvature, R1 of about 100 mm.

The infrared laser crystal beam, for Nd:YLF it is 1053 nm, travels in two directions in the fourth arm of resonator 10. It travels from output coupler 18 through lens 40 and LBO doubling crystal 36 to high reflector 16, and is reflected from high reflector 16 back through the doubling crystal. An output beam at 527 nm is generated. Because output coupler 18 is highly transmissive at 527, an output beam 42 at 527 nm is generated by resonator 10. 527 nm light is generated in the fourth arm in two directions, relative to LBO doubling crystal 36, 527 nm light in the right hand direction, and 527 nm light in the left hand direction. The positioning of LBO doubling crystal 36 in the fourth arm between output coupler 18 and high reflector 16 creates a double pass geometry because 527 nm light is generated in both directions, and output beam 42 is the sum of these beams.

In one embodiment using resonator 10 of FIG. 1, fiber-bundle-coupled diode bars are used for diode source 28 to longitudinally pump Nd:YLF laser crystals 22 with up to 8 W per Nd:YLF crystal. Useful output power is extracted via intra cavity frequency doubling and can result in more than 2 W output power at 527 nm for 16 W of incident pump light from a single 20 W cw diode laser bar. Output beam 42 is substantially round and is of high quality. Doubling efficiency can be fine tuned by varying the temperature of LBO doubling crystal 36 from a preferred temperature of about 160° to 175° C. Both the 527 nm output beam 42 and the infrared laser crystal beam are nearly diffraction-limited. The RF spectrum indicates that under certain conditions substantially no heterodyne peaks other than the c/2L peak at nearly 140 MHz are present, indicating that resonator 10 is oscillating on its lowest order spatial mode.

In this embodiment, resonator 10 has a length L of about 1 m. L is equal to the total of L1, L2, L3 and L4. Additionally, resonator 10 exhibits the lowest amplitude noise when resonator alignment, LBO doubling crystal 36 angle, and LBO doubling crystal 36 temperature are adjusted in a way that results in primarily a single peak at the c/2L frequency in the RF spectrum. LBO doubling crystal 36 can be slightly off of normal incidence with respect to the cavity mode for this effect. In this state, the % RMS is as low as less than 3%, preferably less than 2%, and most preferably less than about 1%, as measured by an RMS meter over a range of 10 Hz to 10 MHz.

Additionally, in this embodiment, the optical spectrum of resonator at both the 527 nm output beam and the 1053 nm laser crystal beam indicates that at least 10 axial modes are oscillating at any one time, and as many as ~100 or more axial modes may be oscillating. The bandwidth of the intracavity infrared laser beam is about 35 GHz while 527 nm is produced, indicating that 100–200 axial modes can oscillate, and for certain alignment configurations the optical spectrum can have a structure indicating that the LBO doubling crystal 36 may be acting like an etalon. With the LBO doubling crystal 36 removed, the infrared axial mode spectrum stabilizes, with about 10 axial modes oscillating, and a bandwidth of about 30 GHz. The c/2L mode spacing is about 150 MHz for a 1 m resonator cavity 10. The 527 nm output beam 42 has a bandwidth of about >70 GHz.

As more infrared power from laser crystals 22 is generated, more frequency doubled output power can be obtained. Additional pumping ports and pump sources or other laser crystals, such as Nd:YVO4 can facilitate scaling. To achieve high amplitude stability, we find that a large number of infrared axial modes must oscillate. With ND:YLF as the active medium, this was achieved with the ~1 meter long cavity. The cavity length (or resonator length) of diode pumped resonators for intracavity doubling of the prior art were typically very short, at typically less than 10 cm. Short lengths increase c/2L axial mode spacing, and therefore typically decrease the number of axial modes that can oscillate within the available bandwidth of the laser crystals. Another technique for broadening bandwidth would utilize a broad bandwidth material, like Nd:LMA.

Resonator 44, illustrated in FIG. 3, has a simpler geometry than resonator 10 of FIG. 1. Resonator 44 includes a first arm that is defined by a high reflector 44 and an output coupler 46. Positioned along an optical axis of the first arm is laser gain medium 22. A diode pump source 28 delivers pump beam 30 through optical fiber 32, or a bundle of fibers. Lenses 24 and 26 focus pump beam 30 so it is incident on laser gain medium 22, and a laser crystal beam is produced. The second arm of resonator 44 is defined by output coupler 46 and a high reflector 48. Resonator 44 has a length L that is equal to the total lengths of the first and second arms. Positioned along an optical axis of the second arm is a doubling crystal 36. An optional Brewster plate 34 is positioned included in resonator 44, and positioned in the first arm.

Figure 2:
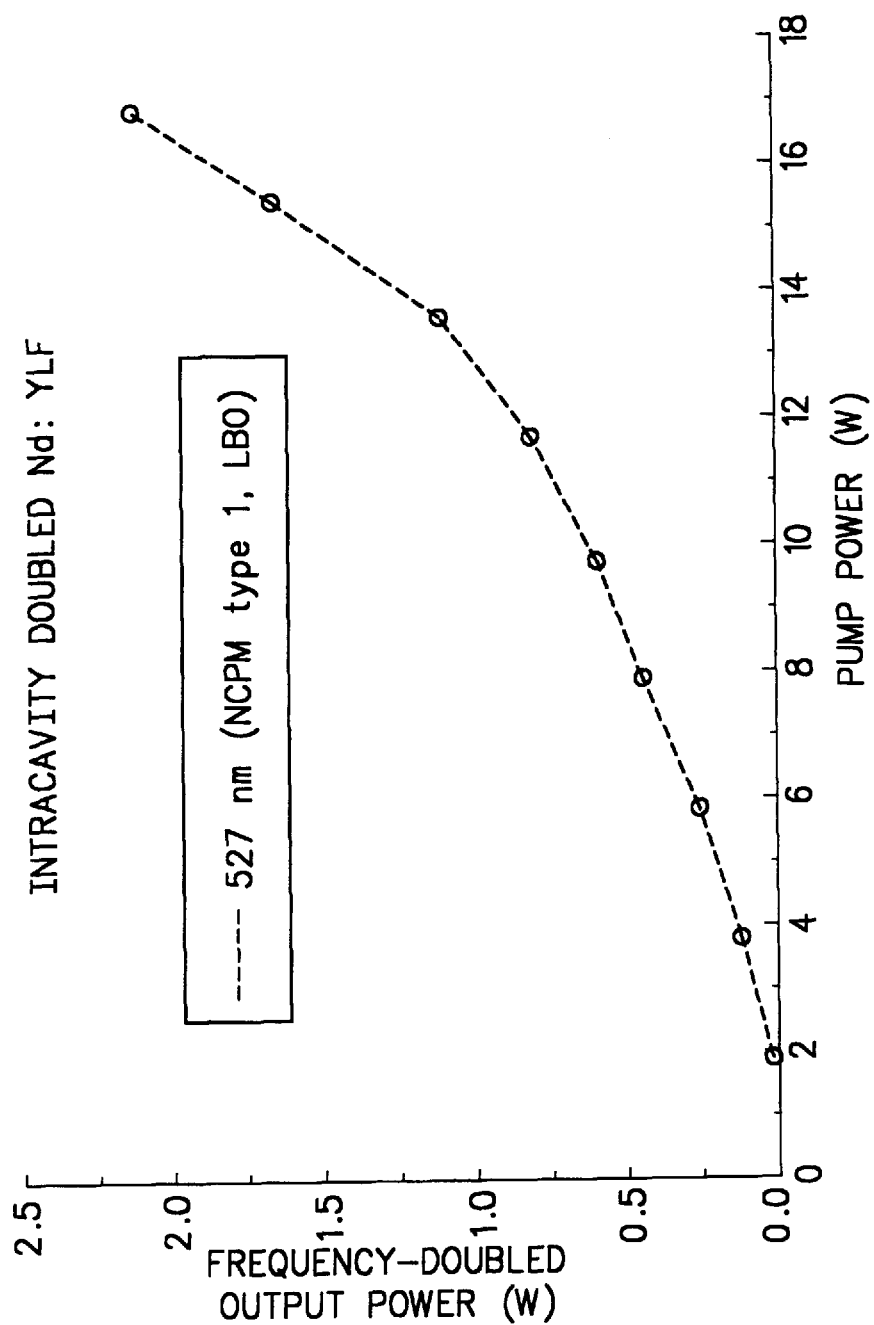
FIG. 2 is a graph illustrating frequency doubled output power as a function of incident optical input power of the laser resonator shown in FIG. 1.

The laser beam is reflected from output coupler 46 and is incident on doubling crystal 36. The second arm provides a double pass geometry for the generation of the frequency doubled output beam 42. If LBO is used as doubling crystal 36, then a heating element, not shown, is necessary. Additionally not illustrated in FIG. 2 is a lens disposed between doubling crystal 36 and output coupler 46. Inclusion of the lens is dependent on the type of doubling crystal 36 used, and on the radius of curvature and focussing ability, of high reflector 48 and output coupler 46.

Resonator 52, shown in FIG. 4, does not include fold arms. Resonator 52 does not provide for a double pass geometry of the infrared beam through doubling crystal 36, and a portion of frequency doubled output beam 42 is lost in resonator 52. Again, through doubling crystal 36 frequency doubled output beam 42 is generated in both directions. However, with resonator 52, the portion of frequency doubled output beam 42 traveling to the left of doubling crystal 36 is lost.

In one embodiment, the laser the resonator is a diode pumped, multi axial mode, intracavity doubled laser with low amplitude noise. This is created by oscillating a plurality of axial modes, such as 10, and in some instances ~100. In one embodiment, a long resonator structure creates the multi axial modes. The length of the resonator can be in the range of 0.3 m to 2 m. Other techniques can also be used to insure multi axial mode operation. For example the laser crystal 22 can be positioned as close as possible to one end of the resonator, taking advantage of the effects of spatial hole burning which is maximized as laser crystal 22 is moved close to an end. Additionally, a high reflecting coating can be place on laser crystal 22. Laser crystal 22 materials with broad band widths, on the order of a few hundreds of gHz, can also be used to generate the many axial modes.

Although a green output beam has been described, blue, red, near infrared and beams of other wavelengths are possible, depending on the choice of laser and doubling crystals. Additionally, any output beam of a desired frequency can be obtained.

Figure 5:
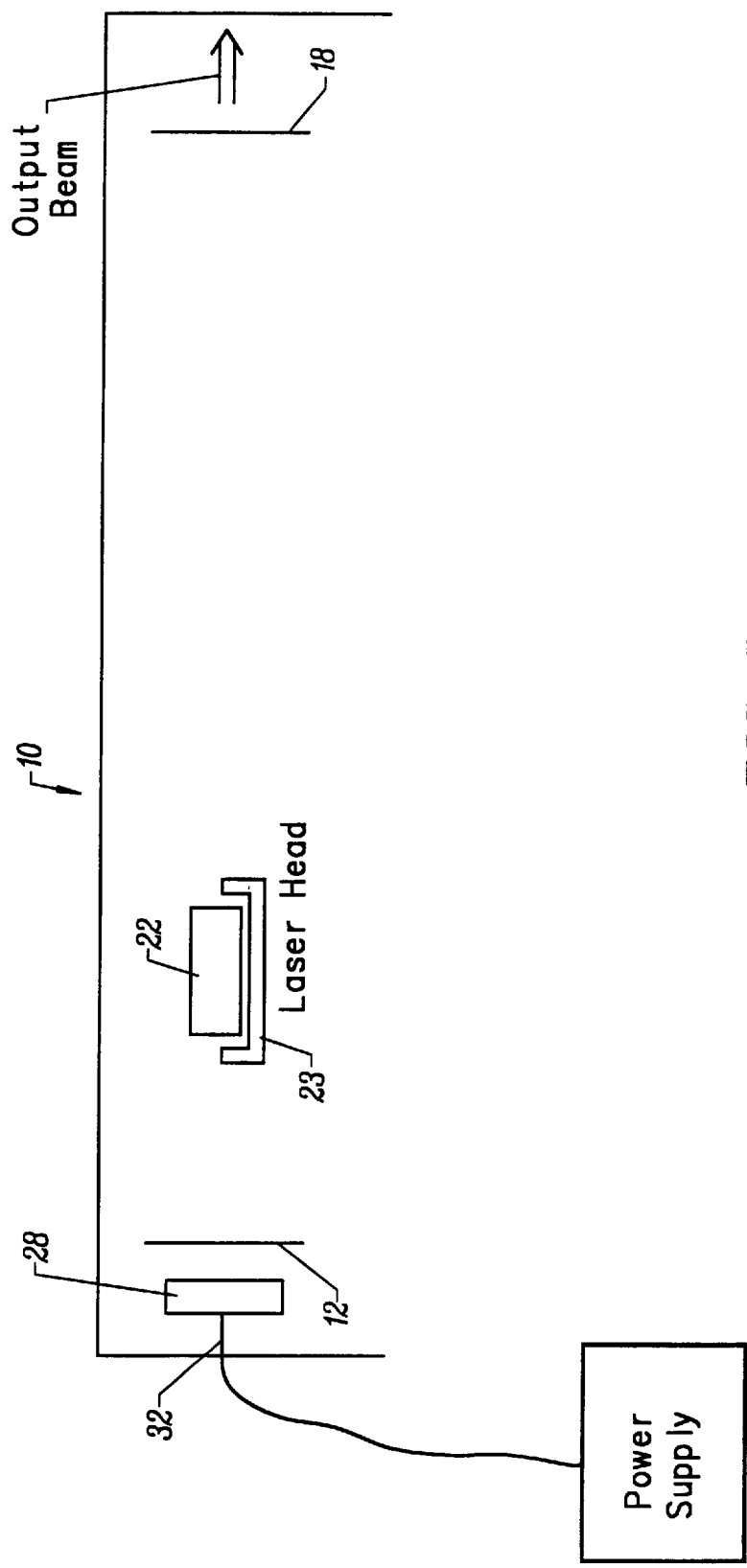
FIG. 5 is a schematic diagram of a single axial mode resonator with the temperature controller positioned in the laser head.

Referring now to FIG. 5, resonator 10 is defined by a high reflector 12 and an output coupler 18. In this embodiment, a single axial mode output beam is produced. A variety of different gain medium 22 can be used to create output beams of different frequencies. Temperature controller 23 is positioned in a laser head. A pump source 28, which can be a diode source or other source, is coupled to the power supply. Temperature controller 23 maintains gain medium 22 at a temperature of 25 degrees C. or greater.

Figure 6:
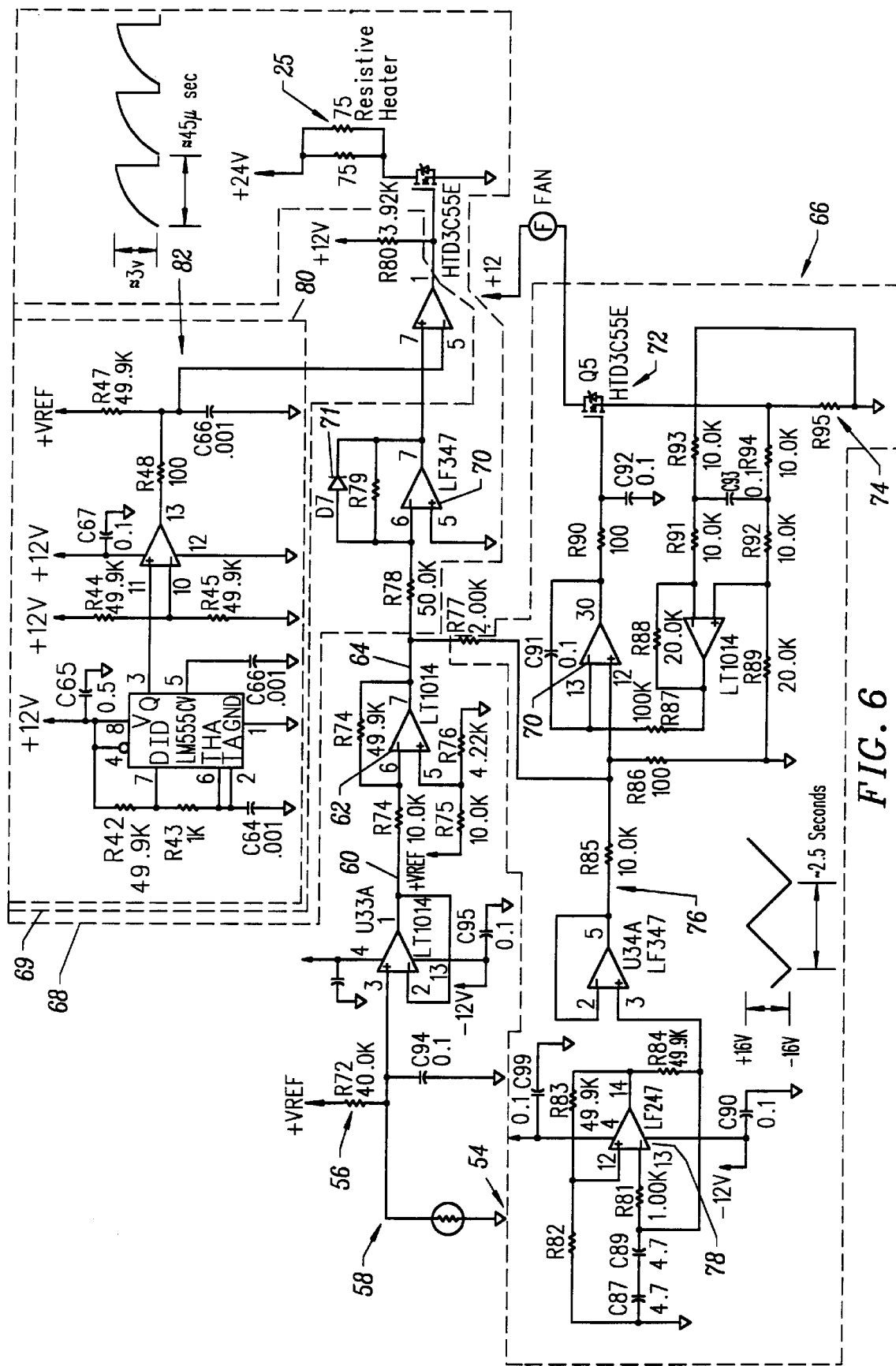
FIG. 6 is a circuit diagram for control of a variable speed fan and a resistive heater of the resonator of FIG. 5.

Referring now to FIG. 6, one embodiment of the electrical circuitry which controls both fan 25 and a resistive heater is illustrated. The temperature of gain medium 22 is sensed by a thermistor 54. A typical thermistor has a resistance of 10 Kohms at 25 degrees C. Thermistor 54 is connected between signal ground and a fixed-value resistor 56. The other end of resistor 56 is connected to a reference voltage, such as 5 volts DC. This combination creates a signal voltage 58 which corresponds to temperature. Signal 58 is optionally buffered by an operational amplifier, creating signal 60. Op amplifier 62 and the associated resistors compare signal 60 against a voltage corresponding to the desired temperature and amplify the difference to create an error signal 64. Error signal 64 is sent to variable speed fan control circuitry 66 and to resistive heater circuitry 68.

The major part of variable speed fan control circuitry 66 consists of the current regulation circuit consisting of op amplifier 70, power transistor 72, current sense resistor 74, and related circuitry. The average speed of fan 25 is controlled by controlling the average current through fan 25. The operation of this portion of circuitry 66 is readily understood by those skilled in the art.

The unusual part of circuitry 66 is the addition of a slow dither signal 76 to error signal 64. Dither signal 76 is added because fans 25 typically do not operate well at low current levels, and often completely stall. Dithering provides a higher commanded current part of the time, helping fan 25 to turn. Dithering then reduces the commanded current for a period of time, keeping the average fan current the same. If the thermal time constants of the system are "long" compared to the dither period, then the net effect is a slower equivalent fan speed than can be achieved without the dither. The particular dither signal 76 used is approximately triangular with approximately a 2.5 second period. Dither signal 76 is produced by op amplifier 78 and associated circuitry. Sinusoidal, square, or other types of dither signals 75 may also be used.

Resistive heater control circuitry 68 consists of amplifier 70, saw tooth generator 72, and a switching transistor. Amplifier 70 inverts and amplifies the signal. A diode is used to reduce the amplitude of negative voltages which could be applied to a comparator. Circuitry 80 generates a saw tooth 82 approximately as shown in FIG. 6. When saw tooth 82 is compared with amplified error a duty-cycle modulated waveform is applied to transistor 74. The amount of heating power delivered to the heater resistance is directly proportional to the duty cycle.

Figure 7:
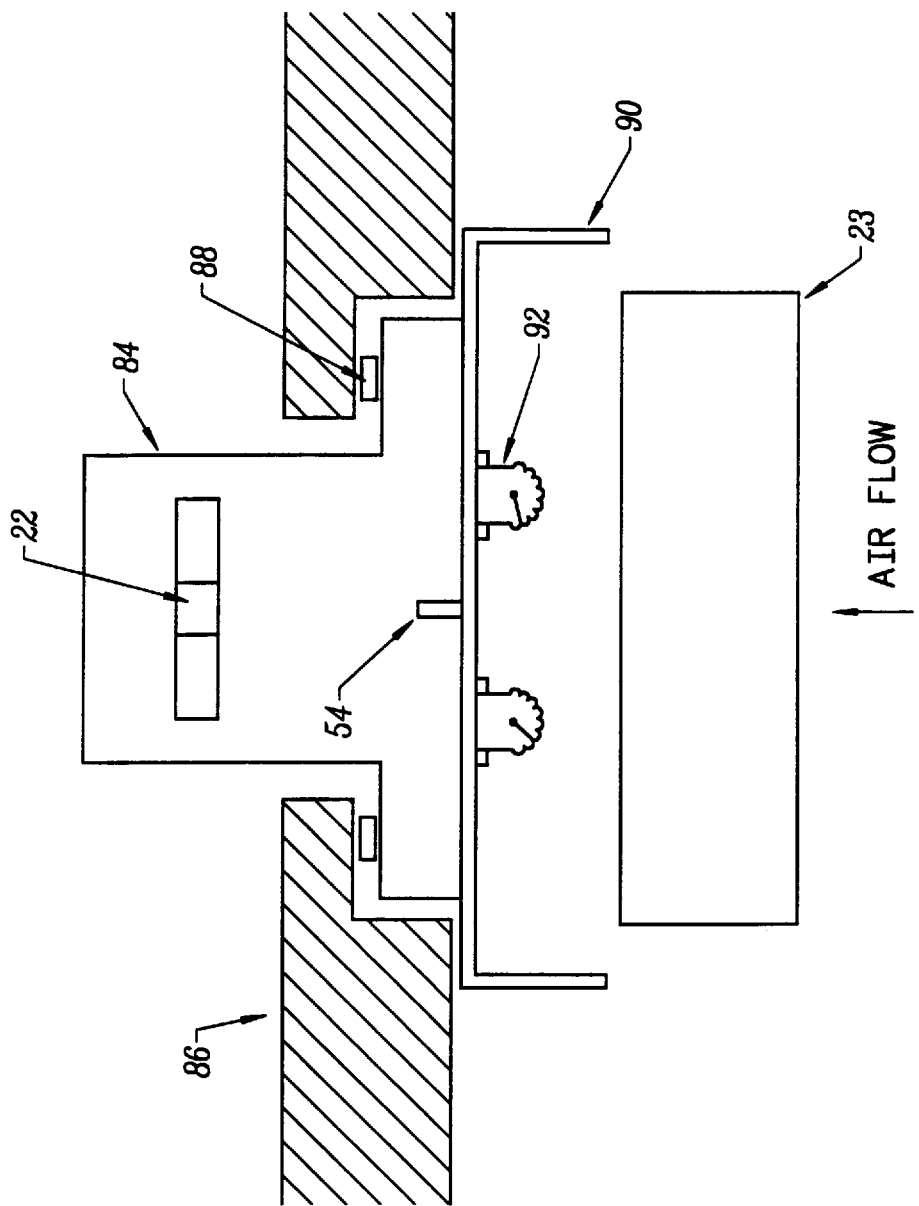
FIG. 7 illustrates one embodiment of the temperature controller of FIG. 5.

One embodiment is illustrated in FIG. 7 where a crystal tower 84 housing gain medium 22 is partially thermally isolated from a body 86 by a spacer 88. Spacer 88 is typically made of G-10 fiberglass, approximately 0.060 inches thick. This thermal isolation decreases the response time to heating and cooling commands from the temperature control circuitry, allowing higher several loop bandwidths and better control. Thermistor 54 is embedded in crystal tower 84 which may be made of copper for good thermal conductivity. Heat sink 90 and heater resistors 92 may be attached to crystal tower 84 by using bolts and a thermally conductive paste or pad. The resistors are commercially available from Dale or Ohmite.

Fan 25 is mounted as close as practical to the bottom of heatsink 90 with the airflow directed toward heatsink 90. This helps to ensure turbulent airflow and provides the most efficient cooling. In one embodiment, heatsink 90 is a simple flat copper plate, bent on four edges and without "fins". Fan 25 may be a small fan, such as the Sunon model KDE 1206PHB2.

Changes and modifications in the specifically described embodiments can be carried out without departing from the scope of the invention which is intended to be limited only by the scope of the appended claims.

What is claimed is:

1. A multi axial mode laser, comprising:
   at least two resonator mirrors defining a first resonator cavity;
   a gain medium positioned in the first resonator cavity;
   a temperature controller coupled to the gain medium and configured to maintain the gain medium at a temperature at least equal to 25 degrees C.;
   a pump source supplying a pump beam to the gain medium and producing a first output beam with a plurality of axial modes with a % RMS of less than 3%; and
   a power source coupled to the pump source.

2. The laser of claim 1, wherein the gain medium is $Nd:YVO_4$.

3. The laser of claim 2, wherein the temperature controller maintains the gain medium at a temperature in the range of 25 to 75 degrees C.

4. The laser of claim 2, wherein the temperature controller maintains the gain medium at a temperature in the range of 45 to 50 degrees C.

5. The laser of claim 2, wherein the temperature controller is a variable speed fan.

6. The laser of claim 2, wherein the temperature controller is one or more resistive heaters.

7. The laser of claim 1, wherein the temperature controller includes a variable speed fan and a resistive heater.

8. The laser of claim 1, further comprising:
   a doubling crystal positioned in the first resonator cavity.

9. The laser of claim 1, further comprising:
   two resonator mirrors defining a second resonator cavity coupled to the first output beam from the first resonator cavity.

10. The laser of claim 9, further comprising:
    a non-linear mixing crystal positioned in the second resonator cavity.

11. The laser of claim 10, wherein the non-linear mixing crystal is a doubling crystal.

12. The laser of claim 1, further comprising:
    a non-linear mixing crystal positioned in the first resonator cavity.

13. The laser of claim 9, wherein a length of the second resonator is substantially the same as a length of the first resonator.

14. The laser of claim 9, wherein a number of the plurality of axial modes in the first resonator is substantially the same as a plurality of axial modes in the second resonator.

15. The laser of claim 9, wherein the first resonator cavity has a length L of sufficient length to produce a doubled output beam having the % RMS less than 3%.

16. The laser of claim 1, wherein the first resonator cavity has a length L of sufficient length to produce at least 10 axial modes in the first resonator cavity.

17. The laser of claim 9, wherein the second resonator cavity has a length L of sufficient length to produce at least 10 axial modes in the second resonator cavity.

18. The laser of claim 1, wherein the first resonator cavity has a length L of sufficient length to produce 100 or more axial modes in the first resonator cavity.

19. The laser of claim 1, wherein the first resonator cavity has a length of about 1 m.

20. The laser of claim 1, wherein the gain medium is made of a material selected from the group consisting of Nd:YLF, Nd:YVO4, Nd:YAG, and Nd:LMA.

21. A laser, comprising:
    a laser head including:
    at least two resonator mirrors defining a resonator cavity,
    a $Nd:YVO_4$ gain medium positioned in the resonator cavity,
    a temperature controller coupled to the gain medium and configured to maintain the gain medium at a temperature at least equal to 25 degrees C.,
    a pump source supplying a pump beam to the gain medium and producing an output beam; and a power source coupled to the gain medium.

22. The laser of claim 21, wherein the temperature controller maintains the gain medium at a temperature in the range of 25 to 75 degrees C.

23. The laser of claim 21, wherein the temperature controller maintains the gain medium at a temperature in the range of 45 to 50 degrees C.

24. The laser of claim 21, wherein the temperature controller is a variable speed fan.

25. The laser of claim 21, wherein the temperature controller is one or more resistive heaters.

26. The laser of claim 21, wherein the temperature controller includes a variable speed fan and a resistive heater.

27. The laser of claim 21, further comprising:

a non-linear mixing crystal positioned in the resonator.

28. The laser of claim 27, wherein the non-linear mixing crystal is a doubling crystal.

29. The laser of claim 21, wherein the gain medium is made of a material selected from the group consisting of Nd:YLF, Nd:YVO4, Nd:YAG, and Nd:LMA.

* * * * *